(12) United States Patent
Cook

(10) Patent No.: US 8,842,114 B1
(45) Date of Patent: Sep. 23, 2014

(54) SYSTEM, METHOD, AND COMPUTER PROGRAM PRODUCT FOR ADJUSTING A DEPTH OF DISPLAYED OBJECTS WITHIN A REGION OF A DISPLAY

(75) Inventor: David Cook, San Jose, CA (US)

(73) Assignee: NVIDIA Corporation, Santa Clara, CA (US)

(*) Notice: Subject to any disclaimer, the term of this patent is extended or adjusted under 35 U.S.C. 154(b) by 202 days.

(21) Appl. No.: 13/098,301

(22) Filed: Apr. 29, 2011

(51) Int. Cl.
*G06T 15/00* (2011.01)

(52) U.S. Cl.
USPC .................. 345/419; 345/420; 359/458

(58) Field of Classification Search
None
See application file for complete search history.

(56) References Cited

U.S. PATENT DOCUMENTS

| | | |
|---|---|---|
| 5,714,512 A | 2/1998 | Bastart et al. |
| 6,197,980 B1 | 3/2001 | Durand et al. |
| 7,064,201 B2 | 6/2006 | Hayashi et al. |
| 7,662,980 B2 | 2/2010 | Liao et al. |
| 7,674,903 B2 | 3/2010 | Hayashi et al. |
| 7,919,113 B2 | 4/2011 | Domb |
| 7,919,497 B2 | 4/2011 | Palladino et al. |
| 7,935,704 B2 | 5/2011 | Palladino et al. |
| 7,956,058 B2 | 6/2011 | Hayashi et al. |
| 2003/0158249 A1 | 8/2003 | Chi et al. |
| 2004/0092428 A1 | 5/2004 | Chen et al. |
| 2005/0090667 A1 | 4/2005 | Hayashi et al. |
| 2005/0197344 A1 | 9/2005 | Palladino et al. |
| 2006/0217553 A1 | 9/2006 | Hayashi et al. |
| 2006/0223822 A1 | 10/2006 | Hayashi et al. |
| 2006/0223823 A1 | 10/2006 | Hayashi et al. |
| 2007/0078138 A1 | 4/2007 | Palladino et al. |
| 2008/0108693 A1 | 5/2008 | Liao et al. |
| 2009/0143997 A1 | 6/2009 | Yaffe et al. |
| 2009/0219283 A1* | 9/2009 | Hendrickson et al. ........ 345/420 |
| 2009/0275762 A1 | 11/2009 | Liao et al. |
| 2010/0091093 A1* | 4/2010 | Robinson ........................ 348/47 |
| 2010/0099897 A1 | 4/2010 | Kim et al. |
| 2010/0111830 A1 | 5/2010 | Boyden et al. |
| 2010/0111831 A1 | 5/2010 | Boyden et al. |
| 2010/0111837 A1 | 5/2010 | Boyden et al. |
| 2010/0111841 A1 | 5/2010 | Boyden et al. |
| 2010/0111842 A1 | 5/2010 | Boyden et al. |
| 2010/0111843 A1 | 5/2010 | Boyden et al. |
| 2010/0111844 A1 | 5/2010 | Boyden et al. |
| 2010/0111845 A1 | 5/2010 | Boyden et al. |
| 2010/0111846 A1 | 5/2010 | Boyden et al. |
| 2010/0111847 A1 | 5/2010 | Boyden et al. |
| 2010/0111848 A1 | 5/2010 | Boyden et al. |

(Continued)

FOREIGN PATENT DOCUMENTS

CN 101525321 9/2009

OTHER PUBLICATIONS

Chen, Jie, "Preparation, Characterization and In Vitro Evaluation of Solid Dispersions Containing Docetaxel," Drug Development and Industrial Pharmacy (2008), 34(6): 588-594.

(Continued)

*Primary Examiner* — Said Broome
(74) *Attorney, Agent, or Firm* — Zilka-Kotab, PC (57) ABSTRACT

A system, method, and computer program product are provided for adjusting a depth of displayed objects within a region of a display. In use, a display that displays one or more objects three-dimensionally is identified. Additionally, a region within the display is determined. Further, a depth of objects displayed within the region is adjusted.

19 Claims, 6 Drawing Sheets

(56) References Cited

U.S. PATENT DOCUMENTS

| | | | |
|---|---|---|---|
| 2010/0111849 A1 | 5/2010 | Boyden et al. | |
| 2010/0111850 A1 | 5/2010 | Boyden et al. | |
| 2010/0111854 A1 | 5/2010 | Boyden et al. | |
| 2010/0111855 A1 | 5/2010 | Boyden et al. | |
| 2010/0111938 A1 | 5/2010 | Boyden et al. | |
| 2010/0112067 A1 | 5/2010 | Boyden et al. | |
| 2010/0112068 A1 | 5/2010 | Boyden et al. | |
| 2010/0113614 A1 | 5/2010 | Boyden et al. | |
| 2010/0113615 A1 | 5/2010 | Boyden et al. | |
| 2010/0114267 A1 | 5/2010 | Boyden et al. | |
| 2010/0114268 A1 | 5/2010 | Boyden et al. | |
| 2010/0114496 A1 | 5/2010 | Boyden et al. | |
| 2010/0114497 A1 | 5/2010 | Boyden et al. | |
| 2010/0114546 A1 | 5/2010 | Boyden et al. | |
| 2010/0119557 A1 | 5/2010 | Boyden et al. | |
| 2010/0121466 A1 | 5/2010 | Boyden et al. | |
| 2010/0143243 A1 | 6/2010 | Boyden et al. | |
| 2010/0152651 A1 | 6/2010 | Boyden et al. | |
| 2010/0152880 A1 | 6/2010 | Boyden et al. | |
| 2010/0163576 A1 | 7/2010 | Boyden et al. | |
| 2010/0168900 A1 | 7/2010 | Boyden et al. | |
| 2010/0185174 A1 | 7/2010 | Boyden et al. | |
| 2010/0187728 A1 | 7/2010 | Boyden et al. | |
| 2010/0285873 A1* | 11/2010 | Tawara et al. | 463/31 |
| 2010/0286254 A1 | 11/2010 | Blatter et al. | |
| 2011/0080420 A1 | 4/2011 | Cook et al. | |
| 2011/0082193 A1 | 4/2011 | Kysilka | |
| 2011/0112036 A1 | 5/2011 | Demeule et al. | |
| 2011/0150765 A1 | 6/2011 | Boyden et al. | |
| 2011/0189125 A1 | 8/2011 | George et al. | |
| 2011/0195030 A1 | 8/2011 | Mumper et al. | |
| 2011/0245260 A1 | 10/2011 | Palladino et al. | |
| 2011/0293745 A1 | 12/2011 | Hoch et al. | |
| 2012/0101738 A1 | 4/2012 | Boyden et al. | |
| 2012/0109613 A1 | 5/2012 | Boyden et al. | |
| 2012/0128783 A1 | 5/2012 | Boyden et al. | |
| 2012/0157517 A1 | 6/2012 | Chen et al. | |
| 2012/0164069 A1 | 6/2012 | Boyden et al. | |
| 2012/0295802 A1 | 11/2012 | Yaffe et al. | |

OTHER PUBLICATIONS

Dev et al., "Isolation and characterization of impunties in docetaxel," Journal of Pharmaceutical and Biomedical Analysis (2006), 40(3):614-622.

Diaz et al., "Changes in microtubule protofilament number induced by Taxol binding to an easily accessible site. Internal microtubule dynamics," Journal of Biological Chemistry (1998), 273(50):33803-33810.

Ekins et al., "Accelerated Communication, A pharmacophore for human pregnane X receptor ligands," Drug Metabolism and Disposition (2002), 30(1):96-99.

Gentile et al., "Synthesis of dimeric and tetrameric macrolactams with cylotoxic activity," Canadian Journal of Chemistry (2000), 78(6):925-934.

Han et al., "Phytantriol-based inverted type bicontinuous cubic phase for vascular embolization and drug sustained release,"European Journal of Pharmaceutical Sciences (2010), 41(5):692-699.

Harper et al., "13C NMR Investigation of Solid-State Polymorphism in 10- Deacetyl Baccatin III," Journal of the American Chemical Society (2002), 124(35):10589-10595.

Jimenez-Barbero et al., "The solid state, solution and tubulin-bound conformations of agents that promote microtubule stabilization," Current Medicinal Chemistry: Anti-Cancer Agents (2002), 2(1):91-122.

Johnson et al., 12, 13-Isotaxanes; Synthesis of New Potent Analogs and X-ray Crystailographic Confirmation of Structure, Journal of Medicinal Chemistry (1997), 40(18), 2810-2812 CODEN: JMCMAR; ISSN: 0022-2623.

Juarez-Guerra et al., "Addition reaction of benzylbenzylideneamine to lithium enolates of 1,3-dioxolan-4-one: synthesis of 2-phenylisoserines," ARKIVOC (2011), (9):354-366.

Lucatelli et al., "Synthesis of C-3'Methyl Taxotere (Docetaxel)," Journal of Organic Chemistry (2002), 67(26):9468-9470.

Muller et al., "'Abnormal' eight-membered ring formation through SN2'intramolecular Nozaki/Kishi reaction in a synthetic approach to a taxane precursor," Tetrahedron Letters (1998), 39(3/4):279-282.

Naik et al., "Preparation of PEGylated liposomes of docetaxel using supercritical fluid technology," Journal of Supercritical Fluids (2010), 54(1):110-119.

Perrin, M.A., "Crystailography of drug polymorphism: emergence of new resolution methods and prediction of crystalline structures," Annales Pharmaceutiques Francaises (2002), 60(3):187-202, with English summary on first page.

Qi et al., "A novel method to synthesize docetaxel and its isomer with high yields," Journal of Heterocyclic Chemistry (2005), 42(4):679-684.

Raczko et al., "Asymmetric syn-dihydroxylation of β-substituted (2R)-N-(α,β-enoyl)bornane-10,2-suitams," Helvetica Chimica Acta (1998), 81(7):1264-1277.

Roy et al., "A concise enantioselective synthesis of a fully oxygen substituted ring A Taxol precursor," Tetrahedron (2003), 59(27):5115-5121.

Skariyachan et al., "Design and discovery of novel therapeutic drugs against *Helicobacter pylori* gastroduodenal cancer by in silico approach," Research Journal of Pharmaceutical, Biological and Chemical Sciences (2010), 1(4):1005-1016.

Skariyachan et al., "In silico investigation and docking studies of E2F3 tumor marker: discovery and evaluation of potential inhibitors for prostate and breast cancer," International Journal of Pharmaceutical Sciences and Drug Research (2010), 2(4):254-260.

Wang et al., "Preparation and evaluation of docetaxel-loaded albumin nanoparticles for intravenous adminsitration," Journal of Chinese Pharmaceutical Sciences (2010), 19(3):214-222.

Zaske et al., "Docetaxel. Solid state characterization by x-ray powder diffraction and thermogravimetry," Journal de Physique IV: Proceedings (2001), 11(Pr10, XXVII JEEP. Journees d'Etude des Equilibres entre Phases, 2001) 221-226.

\* cited by examiner

SYSTEM, METHOD, AND COMPUTER PROGRAM PRODUCT FOR ADJUSTING A DEPTH OF DISPLAYED OBJECTS WITHIN A REGION OF A DISPLAY

FIELD OF THE INVENTION

The present invention relates to stereoscopic rendering, and more particularly to adjusting a depth of displayed objects.

BACKGROUND

Traditionally, three-dimensional rendering has enabled the display of one or more objects to a user. For example, one or more objects may be displayed three-dimensionally to a user, utilizing a display. However, current techniques for displaying objects three-dimensionally have been associated with various limitations.

For example, current methods for displaying objects utilizing a display may display objects that are clipped by the edge of the display. This clipping may confuse viewers of the displayed objects and may also contribute to user eyestrain, headaches, etc.

There is thus a need for addressing these and/or other issues associated with the prior art.

SUMMARY

A system, method, and computer program product are provided for adjusting a depth of displayed objects within a region of a display. In use, a display that displays one or more objects three-dimensionally is identified. Additionally, a region within the display is determined. Further, a depth of objects displayed within the region is adjusted.

DETAILED DESCRIPTION

Figure 1:
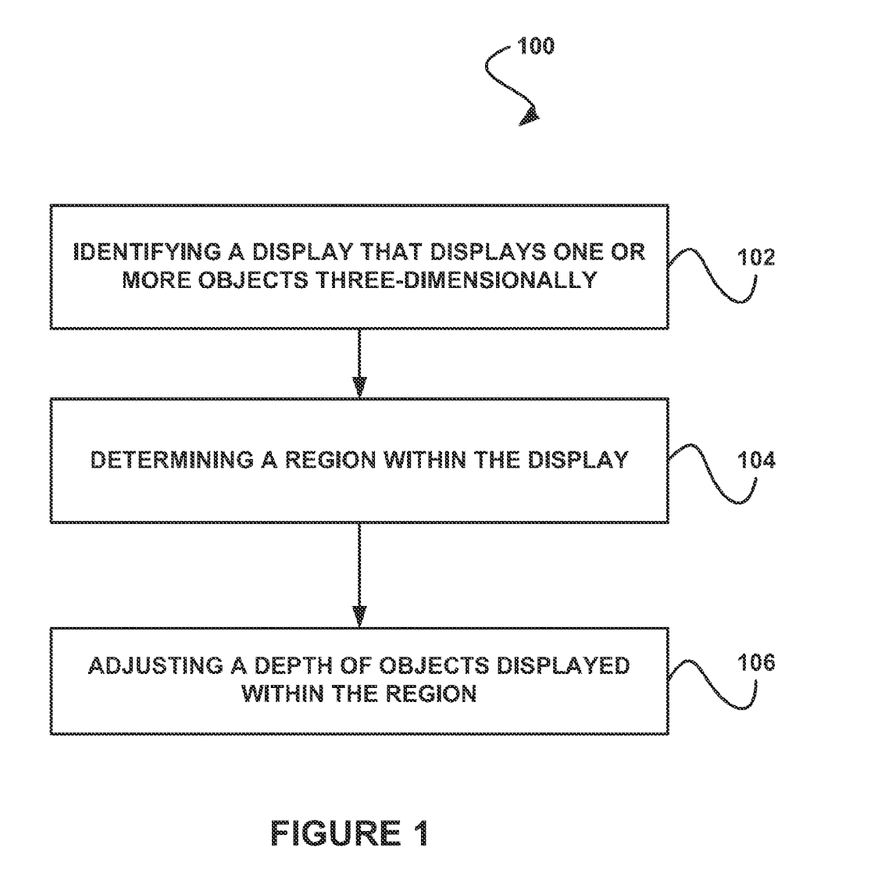
FIG. 1 shows a method for adjusting a depth of displayed objects within a region of a display, in accordance with one embodiment.

FIG. 1 shows a method 100 for adjusting a depth of displayed objects within a region of a display, in accordance with one embodiment. As shown in operation 102, a display that displays one or more objects three-dimensionally is identified. In one embodiment, the display may be included within a device that displays objects to a user. For example, the display may be included within a standalone monitor, a television, a tablet computer screen, a laptop computer screen, etc.

Additionally, in one embodiment, the display may display the one or more objects three-dimensionally using one or more three-dimensional display techniques. For example, the display may display objects to one or more viewers utilizing stereoscopic imaging. In another embodiment, an additional viewing device (e.g., glasses, goggles, etc.) may be used in conjunction with the display in order to display the one or more objects three-dimensionally. In yet another embodiment, the one or more objects may be displayed as part of a scene.

Additionally, as shown in operation 104, a region within the display is determined. In one embodiment, the region may include a predetermined area of the display. For example, the region may include an area from a plurality of edges of the display to a location a predetermined distance from the edges of the display. In another example, the region may include an area at the outer perimeter of the display that has a predetermined width.

Further, in one embodiment, the region may include an outer perimeter of the display that has a width larger than its height. In another embodiment, the region may include an area at an outer perimeter of the display that has a height larger than its width. In yet another embodiment, the region within the display may be determined as a percentage of the display. In still another embodiment, the region may be determined based on one or more factors. For example, the region may be determined based on content that is displayed on the display. In another example, the region may be determined based on a range of depth in a scene displayed by the display.

Further still, as shown in operation 106, a depth of objects displayed within the region is adjusted. In one embodiment, the depth of the objects may include a depth in which an object is perceived three-dimensionally within the display. In another embodiment, the depth of the objects may include a W value of the objects that are rendered within a scene shown utilizing the display.

Also, in one embodiment, adjusting the depth of the objects may include warping the objects. For example, adjusting the depth of the objects may include performing an artificial non-linear alteration of the depth of the objects. In another embodiment, the depth of the objects may be adjusted as the objects travel within the region. For example, the depth of one of the objects may be decreased with respect to a viewer's perspective of the object as the object travels from one part of the region to another part of the region (e.g., from an inner perimeter of the region to an edge of the display, etc.). In another example, the depth of one of the objects may be increased with respect to a viewer's perspective of the object as the object travels from one part of the region to another part of the region.

Additionally, in one embodiment, the depth of the objects may be adjusted automatically according to one or more algorithms. For example, one or more algorithms may perform scaled depth adjustments for the objects based on the location of the objects within the region. In another embodiment, the depth of the objects may be adjusted linearly as an object moves within the region. In yet another embodiment, the depth of the objects may be adjusted in a non-linear fashion. For example, the depth of the objects may be adjusted more heavily as the object approaches an edge of the display.

In this way, the depth of the objects may be gradually and artificially adjusted within areas of the display where eyestrain may occur, such that when three dimensional viewing is performed, the objects may appear to be closer depth wise to the display, thereby reducing eyestrain.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
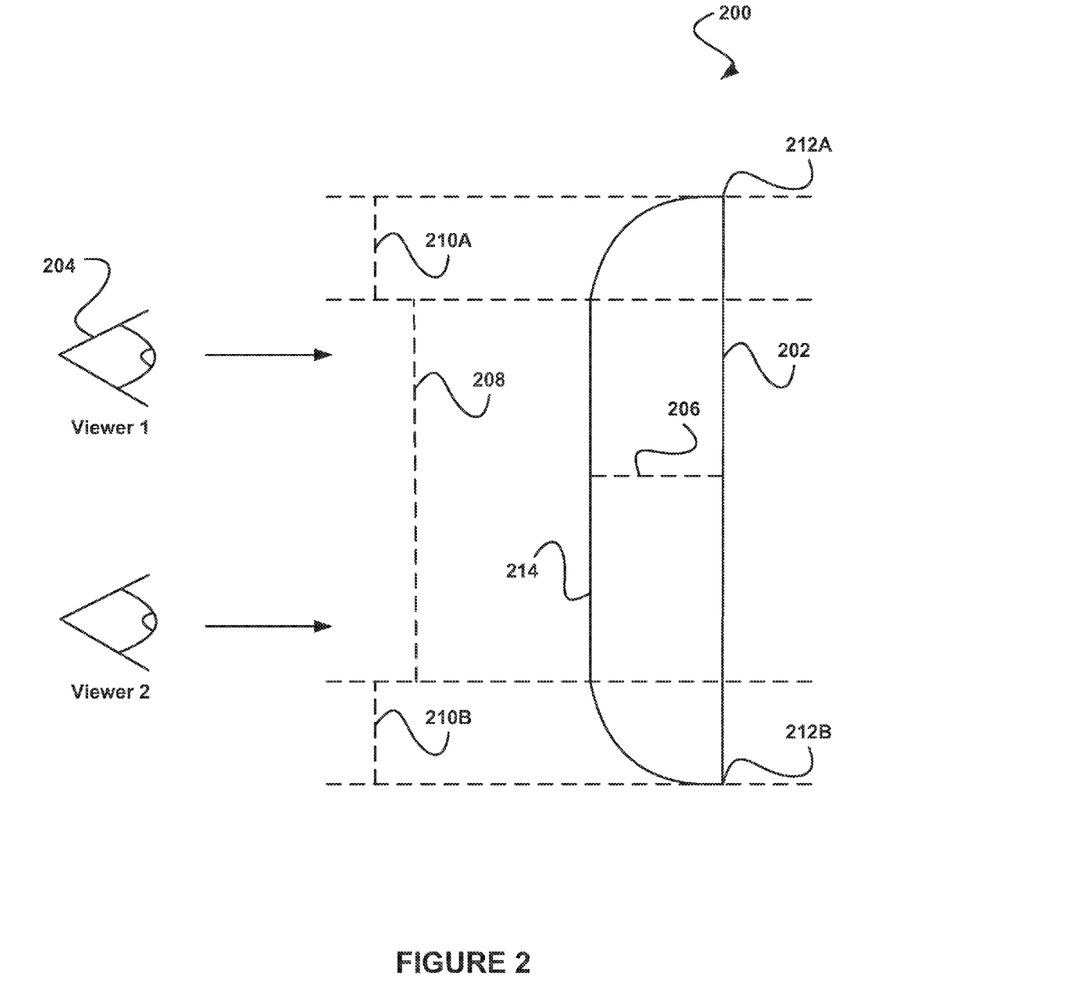
FIG. 2 shows a side view of a stereoscopic display in which automatic depth adjustment is performed, in accordance with another embodiment.

FIG. 2 shows a side view of a stereoscopic display 200 in which automatic depth adjustment is performed, in accordance with another embodiment. As an option, the present display 200 may be implemented to carry out the method 100 of FIG. 1. Of course, however, the display 200 may be implemented in any desired environment. It should also be noted that the aforementioned definitions may apply during the present description.

As shown, a user 204 (e.g., a viewer, etc.) views one or more objects that are displayed three-dimensionally by a stereoscopic display 202. For example, the user 204 may view visual content (e.g., a movie, television show, video game, computer display, etc.) three-dimensionally through the display 202 utilizing stereoscopic rendering. Additionally, the objects displayed three-dimensionally to the user 204 at a central region 208 of the display 202 appear at a predetermined depth 206 to the user 204. For example, the objects may be displayed at the predetermined depth in a scene presented to the user 204.

Further, the display 202 includes perimeter regions 210A and 210B near the perimeter of the display 202. In one embodiment, an object displayed to the user 204 may move from the central region 208 of the display 202 into one of the automatic perimeter regions 210A and 210B, and may exit the scene displayed by the display 202 at one of the edges 212A or 212B of the display 202.

In another embodiment, from the time the object enters one of the automatic depth adjustment regions 210A and 210B until the object exits the scene at one of the edges 212A or 212B of the display 202, the depth at which the object is displayed on the display 202 may be reduced from the predetermined depth 206 to the depth of the display 202. In another embodiment, the depth level 214 of the display 200 may represent the depth of one or more displayed objects at various locations within the display 200. In another embodiment, the edges 212A or 212B of the display 202 may include the top and bottom edges of the display 202 the left and right side edges of the display 202, etc.

In one embodiment, adjusting the depth of the object may include reducing an in-screen depth of the object with respect to the display 202. For example, the object may be shifted toward the display 202 on a pixel-by-pixel basis. In another embodiment, the depth of the object may be automatically adjusted according to one or more algorithms.

For example, assuming a position Pn is a point of interest in one of the perimeter regions 210A and 210B, position P1 is at one of the edges 212A or 212B of the display 202, and P0 is at the start of the region of interest (e.g., where the central region 208 meets one of the edges 212A or 212B, etc.), the depth Dn may be calculated as shown in Table 1. Of course, it should be noted that the depth calculations shown in Table 1 are set forth for illustrative purposes only, and thus should not be construed as limiting in any manner.

Table 1

$Dn$ adjusted=$Dn-|(Dn-ZPD)|*|(P0-Pn)/(P0-P1)|$ for $Dn>ZPD$, else no adjustment In another embodiment, the above depth calculations may simply scale the depth Dn of the vertex at point Pn by a percentage of the difference of the depths between Dn and the depth at the surface (ZPD) of the display 202. In yet another embodiment, that percentage may be based on a position where at P0 it is 0% and at P1 it is 100%. In still another embodiment, the X or Y dimension may be selected based on whether the object is heading toward the side edge or the top edge. This adjustment is shown in Table 2. Of course, it should be noted that the calculations shown in Table 2 are set forth for illustrative purposes only, and thus should not be construed as limiting in any manner.

Table 2

$Dn$ adjusted=current $Dn$ reduced by a percentage of the difference between current $Dn$ and $ZPD$.

The adjustment illustrated in Table 2 may include a simplified linear adjustment to the depth of an object as viewed by the user 204 as the object approaches an edge 212A or 212B of the display 202. In another embodiment, a non-linear adjustment curve may be utilized instead of a linear adjustment. This may avoid sharp adjustment in the central viewing area close to the central region 208 and may make bigger adjustments closer to the edges 212A and 212B which may include a periphery of the user's 204 viewing. In still another embodiment, the non-linear adjustment curve may be enabled by changing the percentage factor in the equation in Table 2 to an X squared ($X^2$)-like factor, which may result in a correct non-linear adjustment. In this way, the object depth adjustment may become more extreme as the object approaches one of the edges 212A or 212B of the display 202.

In another embodiment, adjusting the depth of the object as it moves across a scene presented by the display 202 may include calculating one or more statistics associated with the object. For example, a mechanism may be created in hardware to keep statistics associated with the depth of one or more objects at various places within the display 202. See, for example, U.S. patent application Ser. No. 12/574,527, filed Oct. 6, 2009, which is hereby incorporated by reference in its entirety, and which describes methods for calculating statistics associated with a surface to be rendered utilizing a graphics processor.

Figure 3:
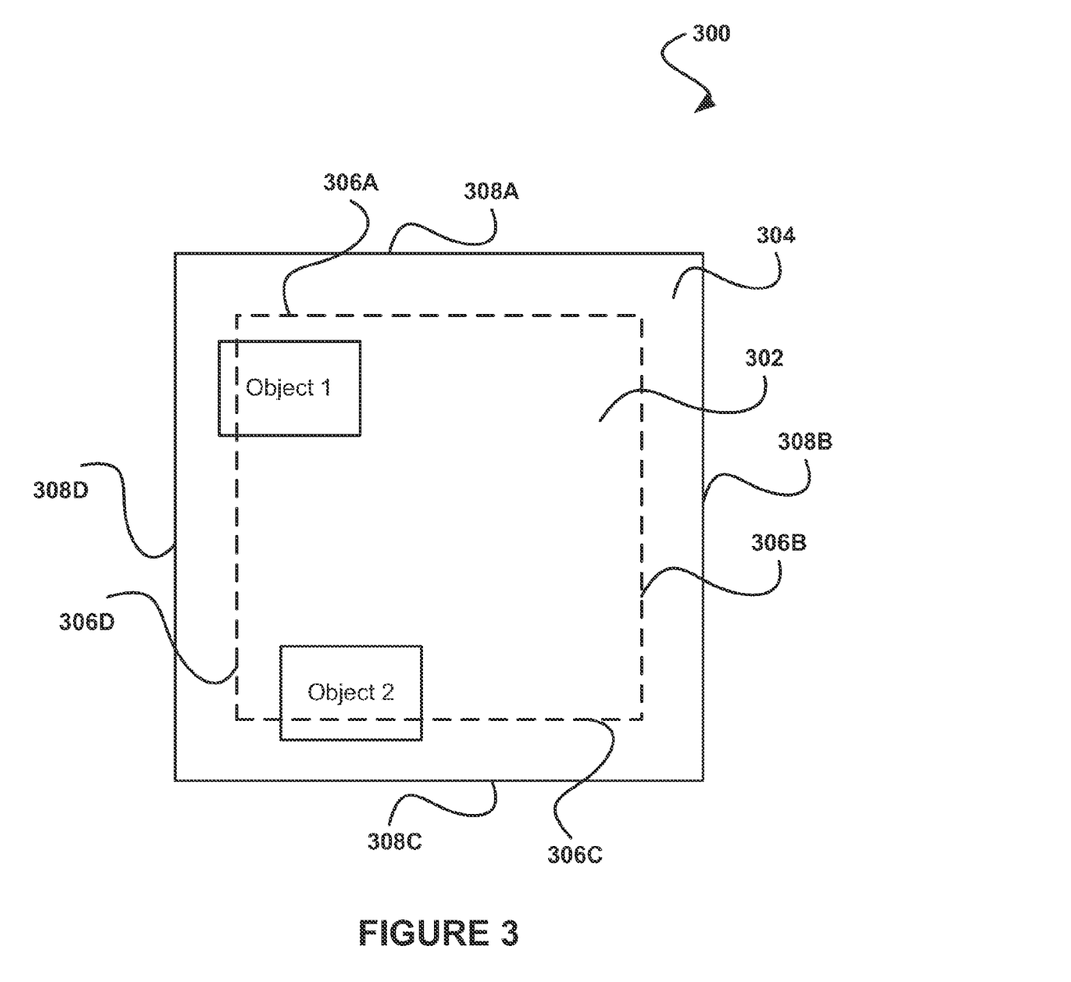
FIG. 3 shows a front view of a stereoscopic display in which automatic depth adjustment is performed, in accordance with yet another embodiment.

FIG. 3 shows a front view of a stereoscopic display 300 in which automatic depth adjustment is performed, in accordance with yet another embodiment. As an option, the present display 300 may be implemented in the context of the functionality and architecture of FIGS. 1-2. Of course, however, the display 300 may be implemented in any desired environment. Again, it should be noted that the aforementioned definitions may apply during the present description.

As shown, the display 300 includes a central display region 302 as well as a perimeter display region 304. In one embodiment, the display 300 may convey one or more objects three-dimensionally at one or more particular depths to a user as part of a scene. Additionally, in another embodiment, one or more of the objects may move from within the central display region 302 toward an edge 308A-D of the display 300, and may therefore enter the perimeter display region 304.

Further, in one embodiment, a depth of the object may be adjusted from the time the object enters the perimeter display region 304 until the time the object exits the display 300 at the edge 308A-D. For example, the depth at which the object is displayed to a viewer may be reduced incrementally from the time the object enters the perimeter display region 304 until the time the object exits the display 300 at the edge 308, such that the depth of the object is adjusted a small amount when the object crosses the inner perimeter 306A-D of the perimeter display region 304 and the depth of the object is adjusted a greater amount as the object approaches the edge 308A-D of the display 300.

Further still, in one embodiment, an object may be displayed at the depth of the display 300 when the object reaches the edge 308A-D of the display 300. In another embodiment, the size of the perimeter display region 304 may be variable. For example, the size of the perimeter display region 304 may be based on the type of content in the scene displayed by the display 300.

In another example, the size of the perimeter display region 304 may be based on a range of depths in the scene. In another embodiment, the depth of an object may be artificially increased going toward the edge 308A-D of the display 300. In yet another embodiment, the objects may be out of screen with respect to the display 300 rather than in screen. In still another embodiment, the depth of an object may be decreased at a different rate at the top and bottom sections of the perimeter display region 304 compared to the left and right sections of the perimeter display region 304.

Additionally, in another embodiment, the top and bottom sections of the perimeter display region 304 may be a different size (e.g., may have a different area, etc.) than the left and right sections of the perimeter display region 304. In this way, the dimensions of the perimeter display region 304 may be adjusted.

Also, in one embodiment, adjusting the depth of one or more objects within the perimeter display region 304 of the display 300 may be performed automatically by adjusting a depth (W) value of the objects within the perimeter display region 304 of the display 300 in direct proportion to the distance of each object from the edge 308A-D of the display 300. For example, artificial non-linear warping of the depth of objects within one or more sides of the perimeter display region 304 may be performed. In another embodiment, the depth adjustments may produce a nonlinear three-dimensional (3D) effect.

In this way, only the depth of objects within the perimeter display region 304 of the display 300 may be adjusted, as eyestrain may occur only within that region. In one embodiment, the objects residing in the perimeter display region 304 may have their depth artificially changed so that when stereopsis is applied, those objects may appear to be closer depth wise to the display 300, which may reduce eyestrain.

Additionally, in one embodiment, scenes including the objects may be further brought out with respect to the display 300 while still making the scene comfortable to view by a user. In yet another embodiment, any distortion of the objects as a result of the depth adjustment may be minimized due to the fact that such adjustments occur in the peripheral vision of a user and the offset of the objects may make them more comfortable to look at.

Figure 4:
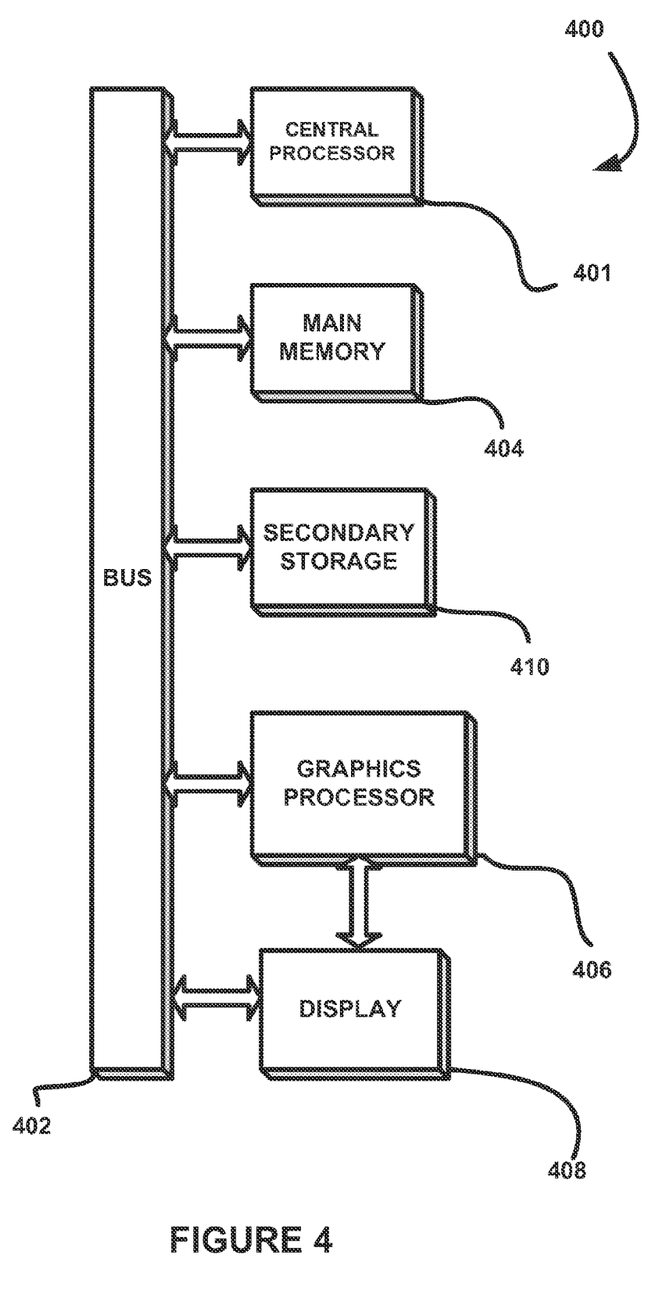
FIG. 4 illustrates an exemplary system in which the various architecture and/or functionality of the various previous embodiments may be implemented.

FIG. 4 illustrates an exemplary system 400 in which the various architecture and/or functionality of the various previous embodiments may be implemented. As shown, a system 400 is provided including at least one host processor 401 which is connected to a communication bus 402. The system 400 also includes a main memory 404. Control logic (software) and data are stored in the main memory 404 which may take the form of random access memory (RAM).

The system 400 also includes a graphics processor 406 and a display 408, i.e. a computer monitor. In one embodiment, the graphics processor 406 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 400 may also include a secondary storage 410. The secondary storage 410 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 404 and/or the secondary storage 410. Such computer programs, when executed, enable the system 400 to perform various functions. Memory 404, storage 410 and/or any other storage are possible examples of computer-readable media.

In one embodiment, the architecture and/or functionality of the various previous figures may be implemented in the context of the host processor 401, graphics processor 406, an integrated circuit (not shown) that is capable of at least a portion of the capabilities of both the host processor 401 and the graphics processor 406, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 400 may take the form of a desktop computer, lap-top computer, and/or any other type of logic. Still yet, the system 400 may take the form of various other devices m including, but not limited to a personal digital assistant (PDA) device, a mobile phone device, a television, etc.

Further, while not shown, the system 400 may be coupled to a network (e.g. a telecommunications network, local area network (LAN), wireless network, wide area network (WAN) such as the Internet, peer-to-peer network, cable network, etc.) for communication purposes.

Figure 5:
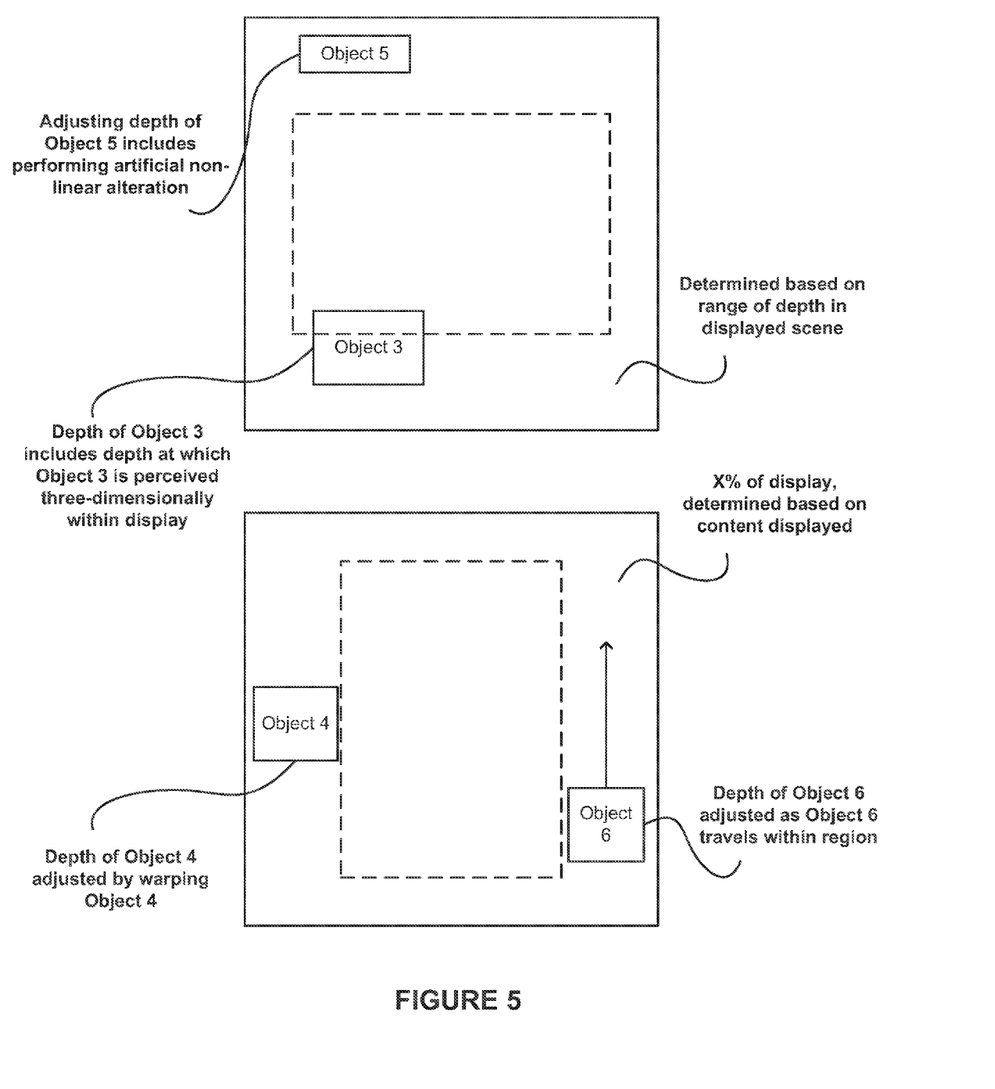
FIG. 5 shows front views of stereoscopic displays in which automatic depth adjustment is performed, in accordance with another embodiment.

FIG. 5 shows front views of stereoscopic displays in which automatic depth adjustment is performed, in accordance with still yet another embodiment.

Figure 6:
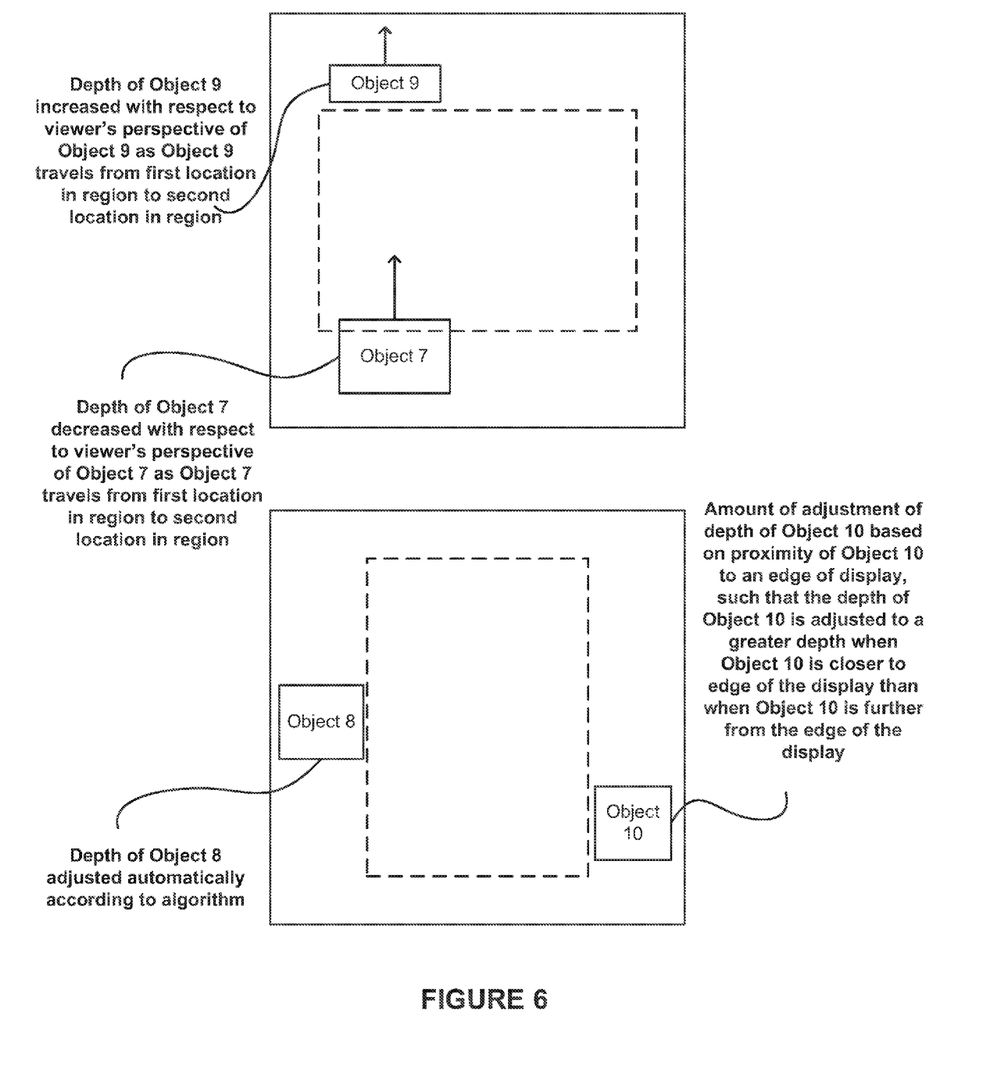
FIG. 6 shows front views of stereoscopic displays in which automatic depth adjustment is performed, in accordance with still yet another embodiment.

FIG. 6 shows front views of stereoscopic displays in which automatic depth adjustment is performed, in accordance with still yet another embodiment.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
identifying a display that displays one or more objects three-dimensionally, the display having a top edge, a bottom edge, a right side edge, and a left side edge;

determining a perimeter display region and a central display region within the display, wherein the central display region is bounded by a first predetermined distance from the top and bottom edges and a second predetermined distance from the right and left side edges and the perimeter display region is bounded by the central display region and the top edge, the bottom edge, the right side edge, and the left side edge; and for each of the objects displayed within the perimeter display region, automatically adjusting a depth of the object as a function of a location of the object, wherein an amount of the adjustment of the depth of the object is based on a proximity of the object to one of the edges of the display, wherein for each of the objects displayed within the central display region, a depth of the object is unchanged.

2. The method of claim 1, wherein the display displays the one or more objects to one or more viewers utilizing stereoscopic imaging.

3. The method of claim 1, wherein an additional viewing device is used in conjunction with the display in order to display the one or more objects three-dimensionally.

4. The method of claim 1, wherein the perimeter display region within the display is determined as a percentage of the display.

5. The method of claim 1, wherein the perimeter display region is determined based on a type of content that is displayed on the display.

6. The method of claim 1, wherein the perimeter display region is determined based on a range of depth in a scene displayed by the display.

7. The method of claim 1, wherein adjusting the depth of the objects includes warping the objects.

8. The method of claim 1, wherein adjusting the depth of the objects includes performing an artificial non-linear alteration of the depth of the objects.

9. The method of claim 1, wherein the depth of the objects is adjusted as the objects travel within the perimeter display region.

10. The method of claim 1, wherein the depth of one of the objects is decreased with respect to a viewer's perspective of the object as the object travels from a first location in the perimeter display region to a second location in the perimeter display region.

11. The method of claim 1, wherein the depth of one of the objects is increased with respect to a viewer's perspective of the object as the object travels from a first location in the perimeter display region to a second location in the perimeter display region.

12. A computer program product embodied on a computer readable medium, comprising:
code for identifying a display that displays one or more objects three-dimensionally, the display having a top edge, a bottom edge, a right side edge, and a left side edge;
code for determining a perimeter display region and a central display region within the display, wherein the central display region is bounded by a first predetermined distance from the top and bottom edges and a second predetermined distance from the right and left side edges and the perimeter display region is bounded by the central display region and the top edge, the bottom edge, the right side edge, and the left side edge; and
code for, for each of the objects displayed within the perimeter display region, automatically adjusting a depth of the object as a function of a location of the object, wherein an amount of the adjustment of the depth of the object is based on a proximity of the object to one of the edges of the display, wherein for each of the objects displayed within the central display region, a depth of the object is unchanged.

13. A system, comprising:
a processor for:
identifying a display that displays one or more objects three-dimensionally, the display having a top edge, a bottom edge, a right side edge, and a left side edge
determining a perimeter display region and a central display region within the display, wherein the central display region is bounded by a first predetermined distance from the top and bottom edges and a second predetermined distance from the right and left side edges and the perimeter display region is bounded by the central display region and the top edge, the bottom edge, the right side edge, and the left side edge, and
for each of the objects displayed within the perimeter display region, automatically adjusting a depth of the object as a function of a location of the object, wherein an amount of the adjustment of the depth of the object is based on a proximity of the object to one of the edges of the display, wherein for each of the objects displayed within the central display region, a depth of the object is unchanged.

14. The computer program product of claim 12, wherein the perimeter display region is determined based on a type of content that is displayed on the display.

15. The computer program product of claim 12, wherein the depth of the objects is adjusted as the objects travel within the perimeter display region.

16. The computer program product of claim 12, wherein the depth of one of the objects is decreased with respect to a viewer's perspective of the object as the object travels from a first location in the perimeter display region to a second location in the perimeter display region.

17. The system of claim 13, wherein the perimeter display region is determined based on a type of content that is displayed on the display.

18. The system of claim 13, wherein the depth of the objects is adjusted as the objects travel within the perimeter display region.

19. The system of claim 13, wherein the depth of one of the objects is decreased with respect to a viewer's perspective of the object as the object travels from a first location in the perimeter display region to a second location in the perimeter display region.

* * * * *